US006684082B1

United States Patent
McClure

(12) United States Patent
(10) Patent No.: US 6,684,082 B1
(45) Date of Patent: Jan. 27, 2004

(54) ADAPTIVE SYSTEM SELECTION DATABASE

(75) Inventor: Kenneth McClure, Irving, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/538,184

(22) Filed: Mar. 30, 2000

Related U.S. Application Data

(60) Provisional application No. 60/171,441, filed on Dec. 22, 1999.

(51) Int. Cl.$^7$ ................................................. H04M 1/00
(52) U.S. Cl. .............................. 455/552.1; 455/435.3; 455/419; 455/432.3
(58) Field of Search ................................. 455/432, 552, 455/433, 435, 436, 440, 419, 420, 422.1, 425, 432.1, 432.2, 432.3, 435.1, 435.2, 435.3, 552.1

(56) References Cited

U.S. PATENT DOCUMENTS 5,903,832 A * 5/1999 Seppanen et al. ............ 455/414
5,950,130 A * 9/1999 Coursey ...................... 455/432

FOREIGN PATENT DOCUMENTS

GB          0779751 A2 * 6/1997 ............ H04Q/7/22

OTHER PUBLICATIONS

TDMA Forum Implementation Guide: Non–Public Mode Operation and Selection in IS–136 Compliant Mobile Stations, Version 2.0, Mar. 9, 1995.

* cited by examiner

Primary Examiner—Nay Maung
Assistant Examiner—Tanmay LeLe
(74) Attorney, Agent, or Firm—Harrington & Smith, LLP; Steven A. Shaw

(57) ABSTRACT

A method is disclosed for operating a mobile station. The method has a first step of storing data into a memory within the mobile station, the stored data including at least one system operator code (SOC) having an assigned priority value. Upon the mobile station receiving a system identification (SID) associated with the stored SOC, the method stores the SID into the memory so as to have the same priority value that is assigned to the SOC. When the mobile station subsequently receives a transmission containing the SID and not the SOC, the mobile station accesses the memory to determine the priority value associated with the SID, and then controls the operation of the mobile station based on the determined priority value. The step of controlling the operation of the mobile station preferably controls at least one of a scanning behavior or a camping behavior of the mobile station.

13 Claims, 3 Drawing Sheets

ADAPTIVE SYSTEM SELECTION DATABASE

CLAIM OF PRIORITY FROM A PROVISIONAL PATENT APPLICATION

Priority is herewith claimed under 35 U.S.C. §119(e) from Provisional Patent Application No. 60/171,441, filed Dec. 22, 1999, entitled "Adaptive System Selection Database", by Kenneth McClure. The disclosure of this Provisional Patent Application is incorporated by reference herein in its entirety.

FIELD OF THE INVENTION

This invention relates generally to wireless telecommunication networks wherein a wireless system or service provider is capable of servicing a particular mobile terminal or mobile station, and pertains more specifically to methods and apparatus for the mobile station to store system selection-related information in a database maintained by the mobile station.

BACKGROUND OF THE INVENTION

The specification of system selection protocols has been an ongoing effort for a number of years in the wireless telecommunications field, in particular in the cellular telephone area. For example, in the AMPS system the mobile station is given a choice between possible serving systems based on the system identification (SID) parameter, wherein in one technique the mobile station is enabled to identify and select its Home system when it is encountered.

A further development provided positive/negative SID lists, where the positive SID list contains SID information for desirable non-Home systems, while the negative SID list contains SID information for those systems that are to be used only in the event an emergency call needs to be originated by the mobile station. This technique can be used in conjunction with the Home SID, as well as certain frequency band preferences, to provide a desired band scanning order with restrictions.

Another development is referred to as Intelligent Roaming, which is an expansion of the positive/negative SID list technique. In the Intelligent Roaming approach various mechanisms are provided to: use a broadcast System Operator Code (SOC) as well as the SID to prioritize systems; provide for three different priorities (in addition to Home and Unidentified); for prioritizing the 800 MHz and 1900 MHz bands for scanning; for transitioning to a more preferred system when camped on a less preferred system; and for controlling the display of system identification text (using the so-called alpha-tags).

When using the broadcast SOC and the SID the mobile station maintains one list for each, and configurable arbitration is used to control selection when the SID and SOC have different priorities.

One benefit to using the SOC is a reduction in database size, as the SOC(s) for a particular operator do not change between different areas (like the SID). As such, one SOC entry in the mobile station database can encompass all systems belonging to a specific operator, which could require a prohibitive number of SID entries to achieve the same result. When combined with the area-specific system designation of the SID, this technique provides a means to assign a general priority for a particular operator (based on the SOC), while also providing area-specific exceptions (based on the SID).

Intelligent Roaming provides five different system priorities which, in descending priority order are: Home (SID or SOC); Partner; Favored; Neutral (designated by a failure to match SID parameters in the mobile station's database); and Forbidden (utilized only to make emergency calls). The Partner priority provides a method to set multiple SID and SOC entries in the database with an equivalent priority with the HOME SID and SOC. The Favored priority provides a method for having two preferred systems in the same area with one, the Favored system, serving as a less desirable backup for the other (the Home or Partner system).

The Intelligent Roaming technique can also provide a means of displaying a priority-determined alpha-tag to the user of the mobile station. In general, a different alpha-tag is stored for each priority, and the operator can configure which alpha-tag is to be displayed when the mobile station receives a broadcast alpha-tag.

A GAIT Phase 1 system selection technique provides a scheme that is capable of meeting the needs of system operators while minimizing the required implementation effort. One result of this effort has brought about a technique that incorporates Intelligent Roaming and standard GSM system selection, with certain added functionality for cross-protocol issues.

With regard to priority grouping, the system priorities are divided into three groups describing the treatment of systems. The groups are derived from the defined mobile station behavior for each priority, as defined in GSM and ANSI-136. These groups are defined as follows: Group A, utilize immediately without further scanning and, once camped, do not search for a better system; Group B, utilize only when no Group A system in present and, once camped, search for better system; and Group C, use only for emergency calls.

In view of the foregoing background information, a problem has arisen with system identification-based system selection algorithms that utilize certain parameters that may optionally be transmitted, or not transmitted at all under some circumstances. In this case the priority determined by the mobile station for the same system can vary as a function of which channel the mobile station happens to be receiving.

As an example of this problem, assume that a mobile station using Intelligent Roaming camps on a system whose SOC is the only parameter contained in the mobile station's system selection database (not the SID). The SOC is a parameter that is optionally transmitted on a digital control channel (DCCH), and is never transmitted on an analog control channel (ACC). Therefore, as the mobile station moves to different channels in the system the priority of the system can change if the current channel happens to be digital, and can change again if a transition is made to an analog channel. This can cause undesirable results, such as triggering the mobile station to begin scanning for another system even when camped on a control channel of the Home system, or first evaluating all other systems and, finding nothing better, finally obtaining service from the Home system.

As such, it can be appreciated that a need has arisen to address and solve this and other related problems.

OBJECTS AND ADVANTAGES OF THE INVENTION

It is a first object and advantage of this invention to provide an improved single protocol or a multi-protocol system selection technique that overcomes the foregoing and other problems, and that addresses the needs that have arisen.

It is a further object and advantage of this invention to provide a single protocol or a multi-protocol system selection technique for a mobile station that provides for the mobile station to store certain system identification information, preferably the SID, within a dynamic database to thereby allow consistent system prioritization.

SUMMARY OF THE INVENTION

The foregoing and other problems are overcome and the objects of the invention are realized by methods and apparatus in accordance with embodiments of this invention.

The teachings herein provide a single protocol or a multi-protocol system selection technique for a mobile station that provides for the mobile station to store certain system identification information, preferably the SID, within a dynamic database to thereby allow consistent system prioritization.

A method is disclosed for operating a mobile station. The method has a first step of storing data into a memory within the mobile station, the stored data including at least one system operator code (SOC) having an assigned priority value. Upon the mobile station receiving a system identification (SID) associated with the stored SOC, the method stores the SID into the memory so as to have the same priority value that is assigned to the SOC. When the mobile station subsequently receives a transmission containing the SID and not the SOC, the mobile station accesses the memory to determine the priority value associated with the SID, and then controls the operation of the mobile station based on the determined priority value.

The step of controlling the operation of the mobile station based on the determined priority value preferably controls at least one of a scanning behavior or a camping behavior of the mobile station.

Typically there will be at least two wireless systems having different air interface protocols, and one of the at least two wireless systems can be an. ANSI-136 wireless system. The priority value can assign the wireless system to be one of a plurality of priorities such as, for an Intelligent Roaming case, a Forbidden system, a Neutral system, a Favored system, a Partner system, or a Home system. In another embodiment the system priorities could be more or less than these five types, and in fact could be a plurality of system priorities that are defined and assigned by the network operator.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
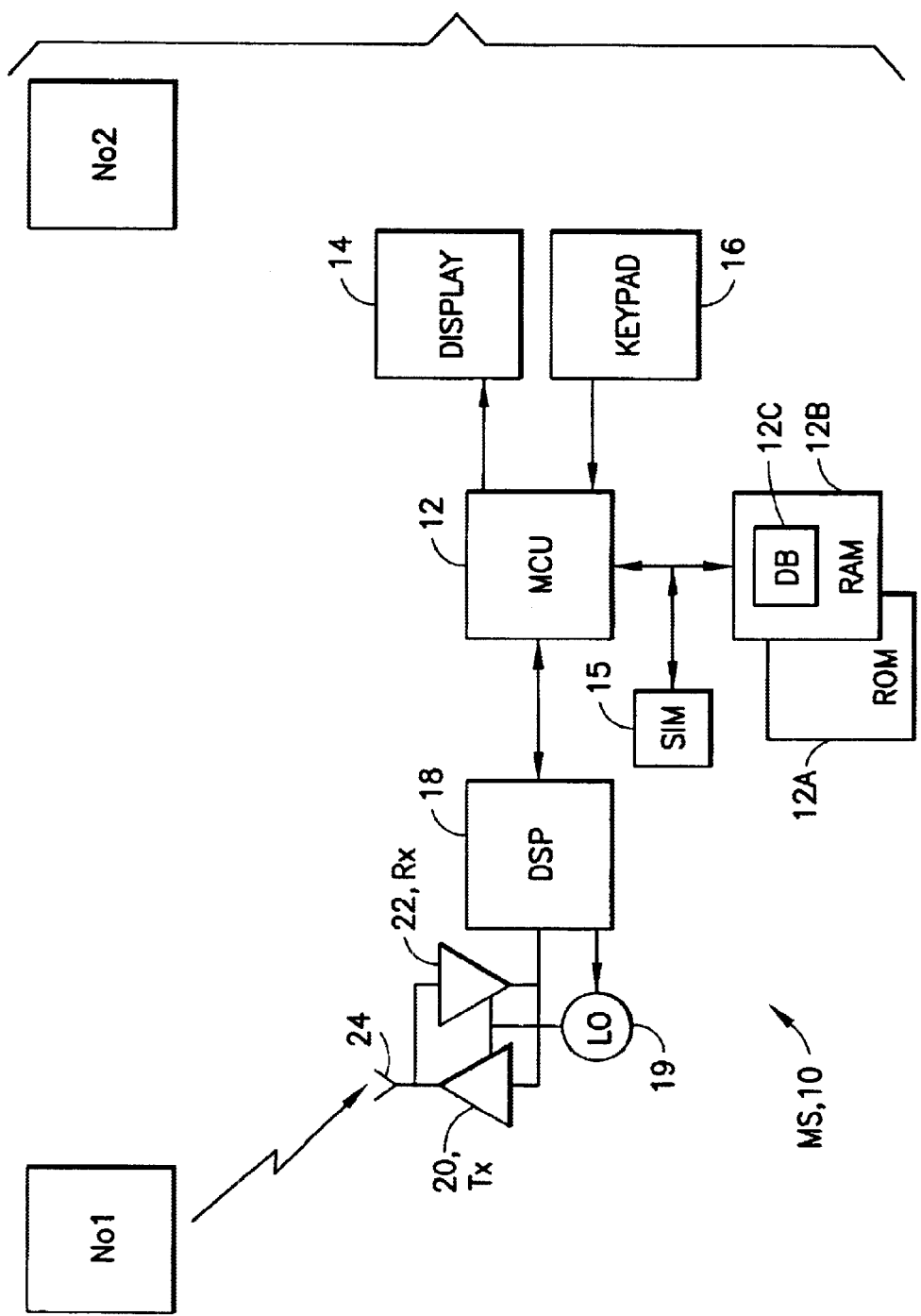
FIG. 1 is a simplified block diagram showing a wireless telecommunications system that includes a mobile station as well as exemplary first and second network operators.

Referring to FIG. 1, therein is illustrated a simplified block diagram of an embodiment of a wireless telecommunications system that includes a mobile station 10 that is suitable for practicing this invention. FIG. 1 also shows a first network operator (NO1), also referred to herein simply as a first system, that transmits in a forward or downlink direction both physical and logical channels to the mobile station 10 in accordance with a predetermined air interface standard or protocol. In the presently preferred, but not limiting, embodiment, the protocol conforms to the above-mentioned ANSI-136 protocol, although other protocols can also benefit from the teachings of this invention.

In a typical case a second (and third, fourth, etc.) network operator (e.g., NO2 or second system) may also be capable of transmitting to the mobile station 10 using the same or a different protocol as NO1, although at any given time the mobile station 10 will be connected to only one network operator. However, when camped on a control channel of NO1 or NO2 the mobile station 10 may be scanning for the other. Although not specifically shown in FIG. 1, it is assumed that a reverse or uplink communication path exists from the mobile station 10 to the network operator, and conveys mobile station 10 originated access requests, a traffic channel and the like.

The mobile station 10 typically includes a micro-control unit (MCU) 12 having an output coupled to an input of a display 14 and an input coupled to an output of a keyboard or keypad 16. The mobile station 10 may be considered to be a radiotelephone, such as a cellular telephone or a personal communicator having voice an/or packet data capabilities, or it may be a wireless packet data terminal. The MCU 12 is assumed to include or be coupled to a read-only memory (ROM) 12A for storing an operating program, as well as a random access memory (RAM) 12B for temporarily storing required data, scratchpad memory, etc. A portion of the RAM 12B may be non-volatile, enabling data to be retained when power is turned off. The non-volatile portion of the RAM 12B is assumed to store a system selection database (DB) 12C that is organized and managed in accordance with the teachings herein. A separate removable SIM 15 can be provided as well, the SIM storing, for example, subscriber-related information. In some embodiments of this invention it may be preferred to store the database 12C in the SIM 15. Regardless of where the system selection database 12C is stored, it is preferred to at least initially download the contents of the database 12C over the air from, for example, the Home network operator.

For the multi-protocol case (e.g., ANSI-136 and GSM), the ROM 12A is assumed, for the purposes of this invention, to store a program for executing the software routines required to achieve compatibility with the various protocols supported by the network operators NO1 and NO2, and also stores a system selection algorithm in accordance with the teachings herein.

The mobile station 10 also contains a wireless section that includes a digital signal processor (DSP) 18, or equivalent high speed processor, as well as a wireless transceiver comprised of a transmitter 20 and a receiver 22, both of which are coupled to an antenna 24 for communication with the currently selected network operator. Some type of local oscillator (LO) 19, which enables the transceiver to tune to different frequency channels when scanning and otherwise acquiring service, is controlled from the DSP 18.

Assume that the mobile station 10 receives the contents of the database 12C in an over-the-air download from, for example, NO1. Further assume in this case that the downloaded data includes the SOC, but not the SID, and also assume that the SOC has a priority of Home. In accordance with the teachings of this invention, when the mobile station 10 subsequently receives the SOC from a digital control channel, and recognizes the Home priority, the mobile station 10 will also receive the SID (which is always transmitted). The mobile station 10 then stores the SID into the database 12C with the same priority indication as the received SOC (or Home in this case, or Partner in another case, or "System Priority n" in another case, where n is some integer having a value which may be defined by the network operator, etc.). Subsequently, if the mobile station 10 receives a channel that does not contain the SOC, but which does contain the SID, the mobile station 10 will recognize that it is in the Home system, and will thus not rescan for another system. Also, the mobile station 10 will not display a Roaming indication to the user.

Figure 2:
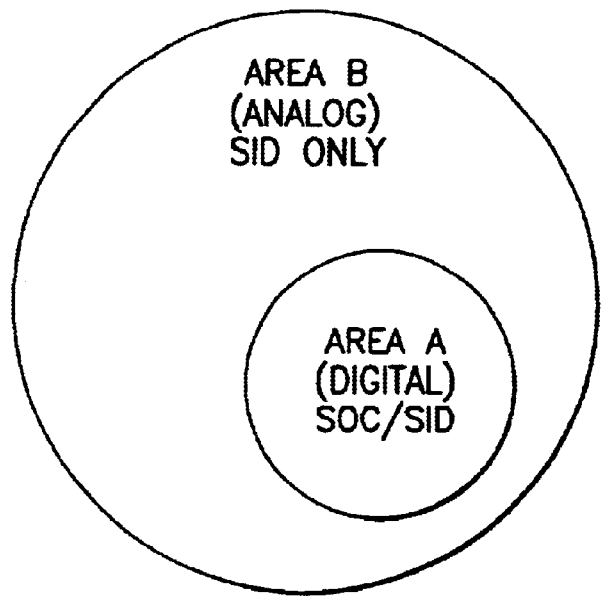
FIG. 2 is a diagram useful in describing a first scenario in which the teachings of this invention can be used to advantage.

Referring to FIG. 2, in accordance with a first example of the utility of this invention, the Area A denotes a portion of the system that has digital (e.g., ANSI-136) coverage. Area B denotes a portion of the system that has only analog coverage. Assume that the mobile station 10 is using Intelligent Roaming, and has stored in the database 12C the system operator's SOC (designated as Home priority), but not the system operator's SID.

When the mobile station 10 is located within the Area A and receives the SOC (indicative of the Home system) it uses the Home system immediately and displays the Home alphanumeric display on the display 14. However, without the use of the teachings of this invention, when in the Area B the mobile station 10 will use the system (even though it is the Home system) only after evaluating all other systems and finding nothing better than Neutral. That is, the Home system will actually be perceived as a Neutral system because the mobile station 10 does not have the Home system's SID stored in the database 12C (only the Home system's SOC is stored). Also, the mobile station 10 will display a Roaming indication, even though it is on the Home system.

The adaptive system selection method of this invention overcomes these problems by having the mobile station 10 store, while in the Area A, the system's received SID in the adaptive database 12C, with the same priority as the SOC. The mobile station 10 then uses the stored SID to correctly identify the system as the Home system when in the Area B, and when only the SID (and not the SOC) is received from the system's base stations.

Figure 3:
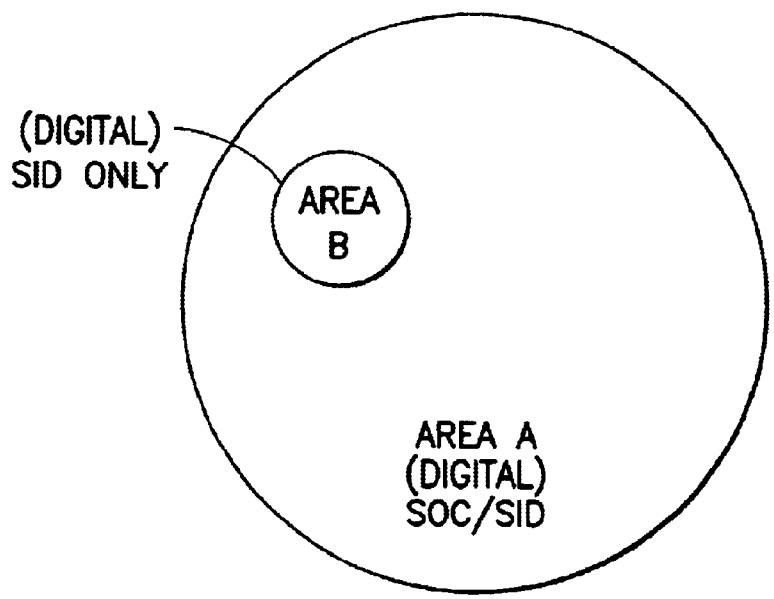
FIG. 3 is a diagram useful in describing a second scenario in which the teachings of this invention can be used to advantage.

Referring to FIG. 3, and in accordance with a second example of the utility of this invention, the Area A and the Area B both belong to the same system. The Area A represents the area covered by digital base stations that broadcast the SOC (and the SID), while the Area B represents a portion of the system wherein one or more digital base stations do not broadcast the SOC (only the SID). Assume as before that the mobile station 10 is using Intelligent Roaming, and has stored in the database 12C the system operator's SOC (designated as Home priority), but not the system operator's SID.

As in the example of FIG. 2, when the mobile station 10 is in the Area A it uses the system immediately and displays the Home alphanumeric display on the display 14. However, without the use of the teachings of this invention, when in the Area B the mobile station 10 will use the system (even though it is the Home system) only after evaluating all other systems and finding nothing better than Neutral. That is, the Home system will actually be designated as Neutral because the mobile station 10 does not have the Home system's SID stored in the database 12C (only the Home system's SOC is stored). Also, the mobile station 10 will display a Roaming indication when in the Area B, even though it is on the Home system.

The adaptive system selection method of this invention overcomes this particular problem by having the mobile station 10 store, while in the Area A, the system's SID in the adaptive database 12C, with the same priority as the SOC, and then use the stored SID to correctly identify the Home system when in the Area B.

In either case, it can be appreciated that the operation of the mobile station 10 is subsequently controlled based on the SID-associated system priority value retrieved from the database 12C, where the controlled operation may be at least one of the mobile station's channel/system scanning behavior, or a camping behavior of the mobile station 10.

Figure 4:
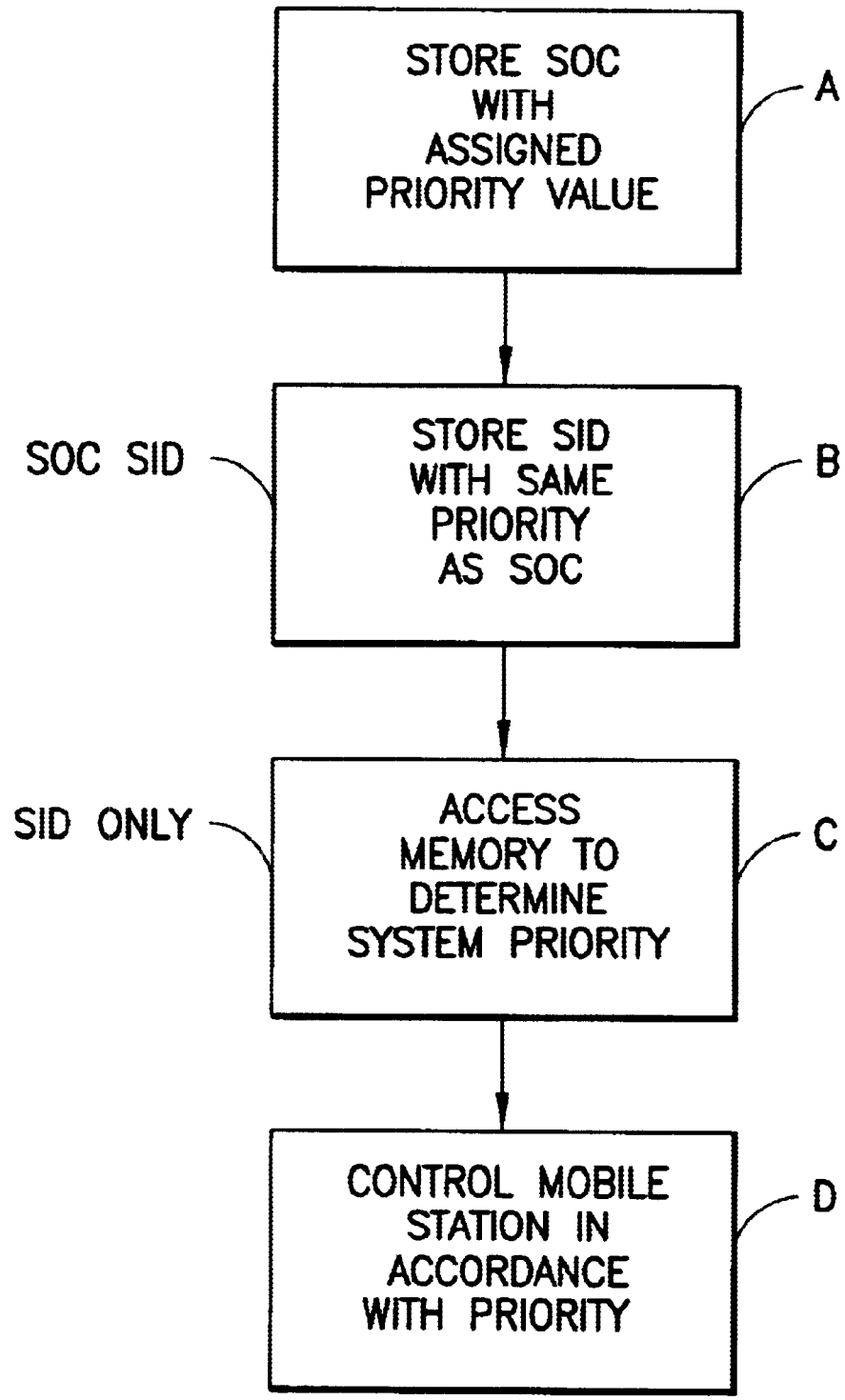
FIG. 4 is a logic flow diagram depicting a method in accordance with the teachings of this invention.

Based on the foregoing description, it can be realized that a method has been disclosed for operating the mobile station 10. Referring to FIG. 4, the method has a first Step (A) of storing data into the memory (database 12C) within the mobile station, where the stored data includes at least one system operator code (SOC) having an assigned priority value. Upon the mobile station 10 receiving a system identification (SID) associated with the stored SOC, the method at Step B stores the SID into the database 12C so as to have the same priority value that is assigned to the SOC. When the mobile station 10 subsequently receives a transmission containing the SID, and not the SOC, through the receiver 22, the mobile station 10 at Step C accesses the database 12C to determine the priority value associated with the SID, and then controls at Step D the operation of the mobile station 10 based on the determined priority value, such as the above-mentioned channel/system scanning behavior and/or the camping behavior of the mobile station 10.

Although described in the context of various types of wireless system protocols, system identifiers, system priorities and the like, it should be appreciated that these are exemplary, and should not be construed in a limiting sense upon the practice of these teachings.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a mobile station, comprising steps of:

storing data into a memory within the mobile station, the stored data comprising first descriptor information specifying an identity of at least one wireless system, the at least one wireless system having an assigned priority value; and upon the mobile station receiving second descriptor information from a system that has first descriptor information stored in the database, storing the received second descriptor information into the memory so as to have the same priority value that is assigned to the system identified by the first descriptor information.

2. A method as in claim 1, and further comprising steps of:

receiving a transmission containing the second descriptor information and not the first descriptor information;

accessing the memory to determine the priority value associated with the second descriptor information; and controlling the operation of the mobile station based on the determined priority value.

3. A method as in claim 2, wherein the step of controlling the operation of the mobile station based on the determined priority value controls at least one of a scanning behavior or a camping behavior of the mobile station.

4. A method as in claim 1, wherein the first descriptor information is comprised of a system operator code (SOC), and wherein the second descriptor information is comprised of a system identification (SID).

5. A method as in claim 1, wherein there are at least two wireless systems having different air interface protocols.

6. A method as in claim 5, wherein one of the at least two wireless systems is an ANSI-136 wireless system.

7. A method for operating a mobile station, comprising steps of:
   storing data into a memory within the mobile station, the stored data comprising at least one system operator code (SOC) having an assigned priority value;
   upon the mobile station receiving a system identification (SID) associated with the stored SOC, storing the SID into the memory so as to have the same priority value that is assigned to the SOC;
   subsequently receiving a transmission containing the SID and not the SOC;
   accessing the memory to determine the priority value associated with the SID; and
   controlling the operation of the mobile station based on the determined priority value.

8. A method as in claim 7, wherein the step of controlling the operation of the mobile station based on the determined priority value controls at least one of a scanning behavior or a camping behavior of the mobile station.

9. A method as in claim 7, wherein there are at least two wireless systems having different air interface protocols.

10. A method as in claim 9, wherein one of the at least two wireless systems is an ANSI-136 wireless system.

11. A mobile station, comprising:
   a controller;
   a wireless transceiver for conducting bidirectional communications with a wireless system; and
   a memory storing data representing first descriptor information specifying an identity of at least one wireless system, the at least one wireless system having an assigned priority value stored in the memory; wherein said controller is responsive to said mobile station receiving second descriptor information from a system that has first descriptor information stored in the memory for storing the received second descriptor information into the memory so as to have the same priority value that is assigned to the system identified by the first descriptor information, said controller being further responsive to the mobile station receiving a transmission containing the second descriptor information and not the first descriptor information for accessing the memory to determine the priority value associated with the second descriptor information, and subsequently controlling further operation of the mobile station based on the determined priority value.

12. A mobile station as in claim 11, wherein the first descriptor information is comprised of a system operator code (SOC), and wherein the second descriptor information is comprised of a system identification (SID).

13. A mobile station as in claim 11, wherein said priority value assigns said system to be one of a Forbidden system, a Neutral system, a Favored system, a Partner system, or a Home system.

\* \* \* \* \*

UNITED STATES PATENT AND TRADEMARK OFFICE
CERTIFICATE OF CORRECTION

| | | |
|---|---|---|
| PATENT NO. | : 6,684,082 B1 | Page 1 of 1 |
| APPLICATION NO. | : 09/538184 | |
| DATED | : January 27, 2004 | |
| INVENTOR(S) | : Kenneth McClure | |

It is certified that error appears in the above-identified patent and that said Letters Patent is hereby corrected as shown below:

In Claim 1: Column 6, line 56, delete "database" and insert --memory--.

Signed and Sealed this

Fourth Day of September, 2012

David J. Kappos
*Director of the United States Patent and Trademark Office*